United States Patent [19]
Mort et al.

[11] Patent Number: 5,122,329
[45] Date of Patent: Jun. 16, 1992

[54] FILM BLOWING APPARATUS

[75] Inventors: Roger C. Mort, Orwigsburg; Semyon Soyferman, Cressona; Stephen J. Weibush, Whitehall; Richard F. O'Brien, Pottsville, all of Pa.; Stephen D. Albert, Midlothian, Va.; Michael D. Schmal, Orwigsburg, Pa.

[73] Assignee: Allied-Signal Inc., Morris Township, Morris County, N.J.

[21] Appl. No.: 673,423

[22] Filed: Mar. 22, 1991

[51] Int. Cl.⁵ .................................. B29C 47/88
[52] U.S. Cl. .............................. 264/569; 264/37; 264/101; 425/72.1; 425/326.1; 425/388
[58] Field of Search ............... 264/557, 569, 37, 38, 264/101; 425/72.1, 326.1, 388

[56] References Cited

U.S. PATENT DOCUMENTS

| | | | |
|---|---|---|---|
| 2,177,633 | 10/1934 | Blackard | 264/563 |
| 2,641,022 | 6/1953 | Kress | 264/569 |
| 2,668,323 | 2/1954 | Johnson | 264/564 |
| 3,226,459 | 12/1965 | Tijunelis | 425/326.1 |
| 3,311,682 | 3/1967 | Ringley et al. | 264/559 |
| 3,331,901 | 7/1967 | Thomas | 425/326.1 |
| 3,337,663 | 8/1967 | Taga | 425/326.1 |
| 3,576,929 | 4/1971 | Turner et al. | 264/569 |

FOREIGN PATENT DOCUMENTS

| | | | |
|---|---|---|---|
| 1960122 | 6/1971 | Fed. Rep. of Germany | 425/326.1 |
| 466114 | 7/1975 | U.S.S.R. | 425/72.1 |

Primary Examiner—Jeffery Thurlow
Attorney, Agent, or Firm—Andrew N. Parfomak; Roger H. Criss

[57] ABSTRACT

A film blowing apparatus for the production of blown polymeric films includes a modified air ring which includes means for the continuous or periodic collection and removal of liquids from the proximity of the circular die which may condense, and further, optionally includes the further step of providing means, preferably a vacuum pump, for withdrawing and optionally collecting the condensed liquids from the surface of the modified air ring facing the blown film.

9 Claims, 2 Drawing Sheets

FILM BLOWING APPARATUS

BACKGROUND

1. Field of the Invention

The invention relates to film blowing apparatus wherein a polymer film is formed by extrusion through a circular die and subsequently expanded by maintaining a positive air pressure within the annulus formed by the extruded film.

2. Description of the Prior Art

Blown film processes, also known to the art as "bubble" or "tubular" film processes are well known to the art and various embodiments of such processes are in widespread use today. In such a process, a mass of molten polymeric material is forced through a circular die which die is typically equipped with or in the alternative, in close proximity to, an air blowing or air injection apparatus which is operated to provide a positive air pressure; the polymeric mass forced through and exiting the annulus of the circular die forms a continuous circular or tubular film in the form of an elongate bubble due to the positive air pressure and this circular film is typically drawn in a direction perpendicular to the circular die by some mechanical means. The film exiting the circular die is also subjected to a second stream of air on the exterior of the bubble by an air ring which is typically at or near the exit of the circular die. The air provided in the interior of the bubble second causes the expansion of the continuous film and consequently causes an increase in the circumference of the bubble, and acts to quench the film, while the second air stream quenches the film. A further effect result of this blowing procedure is the induction of orientation into the film which significantly improves the physical properties of the resultant product film.

While apparatus and methods of forming films by use of such film blowing apparatus are widespread and well known, shortcomings still exist. For example, condensation of constituents which are commonly encountered in the production of blown polymeric films, such as plasticizers, stabilizers, monomers used in producing the film, are known to occur upon surface of the air ring. Consequent to this effect, the condensed liquid upon the air ring surface is known cause spatter, and more particularly, to be entrained in the second air stream and thereby come into contact with the exterior of the bubble of blown film. The effect of such contact by the liquid of the bubble is known to introduce of undesired effects, including discoloration, degradation of the surface appearance or penetration of the film and the formation of holes in the bubble of the film.

While the production of polymeric films by blown film processes is in widespread use today, there nonetheless remains a continuing need in the art for improvements in the processes and apparatus for blown film production, and it is to this need that the present invention is addressed.

SUMMARY

In accordance with one aspect of the present invention, there is provided an improved film blowing apparatus which apparatus comprises an air ring in the proximity to the circular die, said air ring which includes means for the continuous or in the alternative, periodic removal of liquids from the proximity of the circular die.

In a further aspect of the invention, there is provided ana improved air ring for use in a film blowing apparatus which includes a conduit means which has one terminus at the surface of the air ring, and which has another terminus in communication with vacuum means, and optionally may include a liquid collection means intermediate the first terminus and the second terminus for collecting liquids.

In an alternative aspect of the invention there is provided an improved blown film apparatus which includes means for the continuous or periodic collection and removal of liquids from the proximity of the circular die, and further, optionally includes further means for withdrawing and collecting said liquids from the proximity of the circular die.

In yet a further aspect of the invention there is provided improved methods for the production of polymeric films by a blow molding which includes the step of providing means for the continuous or periodic collection and removal of liquids from the proximity of the circular die, and further, optionally includes the further step of providing means for withdrawing and collecting said liquids from the proximity of the circular die.

DESCRIPTION OF THE PREFERRED EMBODIMENTS

Figure 1:
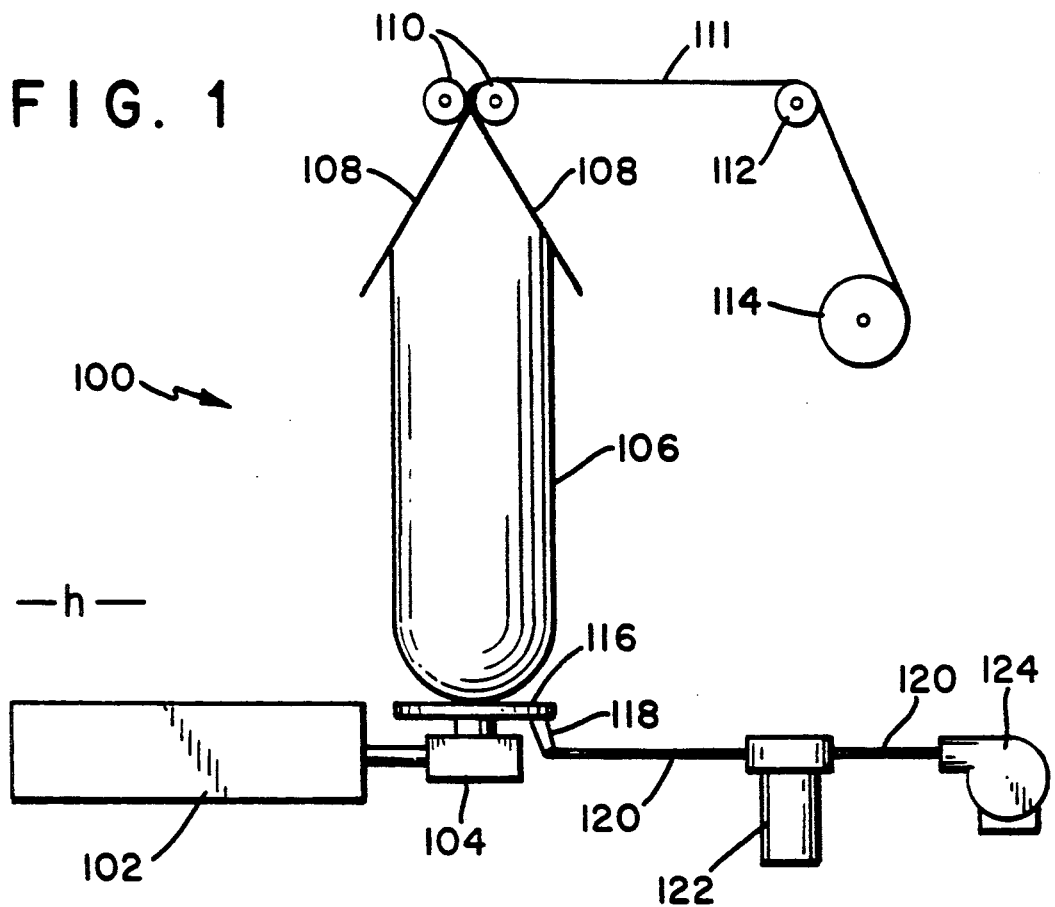
FIG. 1 is a drawing of a blown film apparatus for producing polymeric films which schematically illustrates the use of the present invention.

The invention is more easily understood by reference to specific embodiments which are representative examples according to the teachings of the instant invention. It must be understood however, that the specific embodiments discussed herein are provided only for the purpose of illustration, and not by way of limitation, and it is to be further understood that the invention my be practiced otherwise than specifically described and yet be within the inventive scope.

The invention may be used in a blow molding apparatus which is used to produce a film from a thermoplastic polymer containing composition which comprises at least one constituent in a molten state. Nonlimiting examples of such a thermoplastic polymer containing compositions include those which comprise the following homopolymers and/or copolymers; nylon, polyvinyl chloride, polyolefin, including polypropylene, fluoropolymers, as well as others not particularly delineated here.

The invention finds use in any blown film production process wherein there is the possibility of the collection of liquids in an area adjacent to the periphery of an extrusion die, especially any production process wherein there is the possibility of the condensation of a liquids on an air ring. By way of example, and not by way of limitation, liquids which may condense include those commonly encountered in the production of blown polymeric films, including plasticizers, stabilizers, monomers used in producing the film, and condensed water. The air ring may be of any type, and include single lip air rings, and dual lip air rings.

The present invention comprises an improved film blowing apparatus which apparatus comprises a modified air ring and means for the continuous, or in the alternative, periodic removal of liquids from the proximity of the circular die. The modified air ring may be any air ring which finds use in a film blowing apparatus, including standard air rings of both the single lip and the double lip types known in the art. According to the invention, the air ring comprises a structural feature which may be formed or attached to the air ring which structure acts to at least partially entrain the condensed liquid and minimize the tendency of the condensed liquid to be entrained in a gas stream and ultimately contact the surface of the bubble of the blown film being produced.

As noted before, the air ring may include any structural feature which may be attached to the air ring or in the alternative, form a part of the structure of the air ring which at least partially entrains the condensed liquid. Examples of such air rings include those which have a series of concentric ridges upon the surface of the air ring facing the bubble of the blown film, which concentric ridges are dimensioned to allow for the collection of the condensed liquid between any two or the concentric ridges; the ridges act as a barrier to shield the condensed liquid from any air stream which might entrain it and carry it to the surface of the bubble of blown film being produced. In another embodiment which is preferred, air rings which are provided with at least one passage therethrough which allows for the passage of the condensed liquid formed on the surface of the air ring facing the bubble to pass therethrough may be used. In a further embodiment of air rings which form the preferred and most preferred embodiments of the invention, are those which include at least one weir suited for the collection of liquid and at least one passage within the weir and passing through the air ring. Further, the at least one passage further communicates with a conduit means through which liquid may be withdrawn. The conduit means is preferably and most preferably a tube or pipe.

The means for the continuous, or in the alternative, periodic removal of liquids from the proximity of the circular die preferably and most preferably, further includes a device or apparatus attachable to the conduit and by whose action the collected liquid may be induced to flow from the air ring and into the at least one passage therethrough, and through the conduit means; examples include the pumps, as well as vacuum sources such as vacuum pumps.

The means for the continuous, or in the alternative, periodic removal of liquids from the proximity of the circular die, in addition to the modified air ring and optional conduit means preferably also includes a separator means which may be a filter, filter unit, vessel or bottle which acts to receive the liquid and separate the recovered condensed liquids from a gas. In preferred embodiments, as well as most preferred embodiments, this separator means is a filter unit.

The means for the continuous, or in the alternative, periodic removal of liquids from the proximity of the circular die may be operated in a continuous fashion, or in the alternative, in a periodic fashion. What is meant by continuous fashion is that the said means are continuously operating during the production of the blown film; what is meant by a periodic fashion is that the said means are in discontinuous operation during the production of the film. In the case of case of periodic operation, the period within which the said means is operated may be the same as each other period, or in the alternative, may vary. It should be understood that the selection of which of these operating modes is wholly dependent upon the operating conditions of the film blowing apparatus with which the present invention finds use; selection of the proper operating mode may be determined by experimental means or by observation of the apparatus.

Turning now to FIG. 1, therein is presented a drawing of a blown film apparatus 100 for producing polymeric films which schematically illustrates one embodiment of the present invention and its use. It should be noted that the elements of FIG. 1 are not to scale. The blown film apparatus 100 is representative of the type in common use today and includes an extruder 102 which supplies a die head 104 having a suitable circular die and air injector for forming the polymeric material and expanding the bubble of blown film 106, respectively. The bubble 106 is collapsed by a collapsing frame 108 and folded by the use of rollers 110, and the folded film 111 then is transported over an idler roller 112 to a take up spool or take up core 114 which comprises a packaged product film. The apparatus 100 further includes one embodiment of a modified air ring 116 in accordance to the teaching of the present invention, which modified air ring includes a weir 118 used to collect the liquid condensing on the surface facing the bubble of the modified air ring 116. The weir 118 is coupled to a tube 120 which connects the weir 118 with a filter unit 122 which intakes the collected liquid and any entrained gas, such as ambient air, and separates the liquid and effectively trapping the collected liquid. The outtake of the filter unit 122 is connected by a further section of tube 120 to a vacuum pump which is in continuous operation.

In this embodiment, the apparatus 100 is so configured relative to the horizontal, indicated by the reference symbol "-h-" so that the direction of the bubble of blown film 106 being produced has a central axis which is vertical and the surface of the modified air ring 116 facing the bubble 106 is horizontal. While this embodiment illustrates a process where the central axis of the bubble 106 is vertical and generally perpendicular to the horizontal, as designated by the horizontal indicator, -h-, however other orientations are possible, particularly wherein the central axis of a bubble is in a direction parallel to the horizontal and the bubble would be formed in a horizontal direction.

Figure 2:
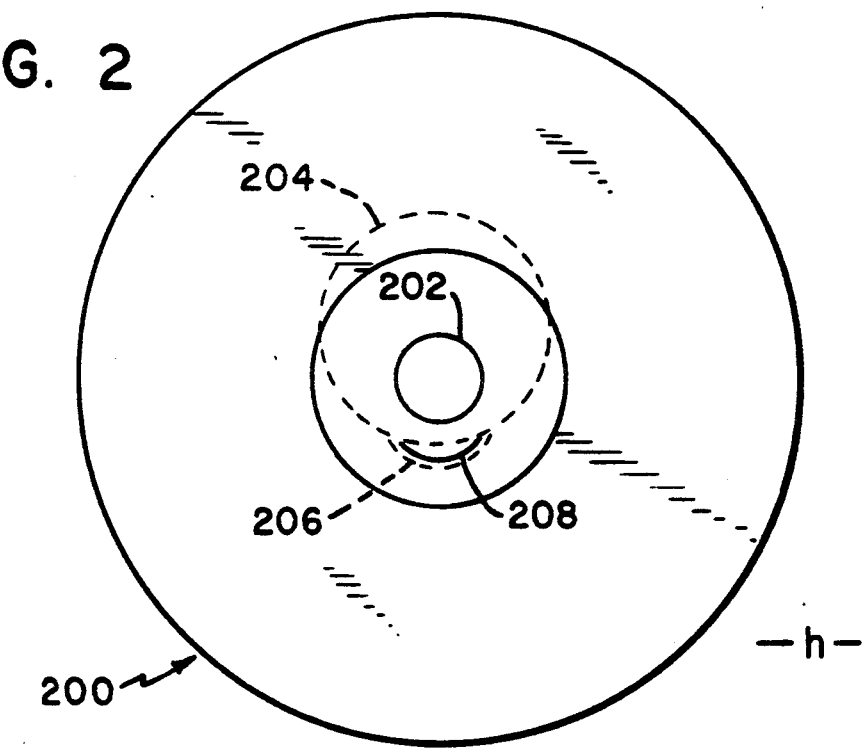
FIG. 2 is a drawing of an embodiment of an air ring modified according to the present invention's teaching.

The next figure, FIG. 2, there is illustrated an embodiment of a modified air ring 200 according to the present invention's teaching which is configured to be used in a film blowing apparatus wherein the central axis of the bubble of blown film would be in the horizontal direction, and parallel to the indicator of the horizontal plane indicator, "-h-" shown in FIG. 2. The circular die 202 used to form a bubble of blown film, indicated in phantom by the dotted line 204 is in a position above a weir 206 which is generally defined by the dashed lines of the figure to indicate a depressed portion of the air ring 200, which weir 206 also includes an opening 208 which is at the bottom of the weir 206 and through which liquids may be withdrawn by means of a tube or pipe (not shown) used for removing any condensed liquids collected on the modified air ring 200.

Figure 3:
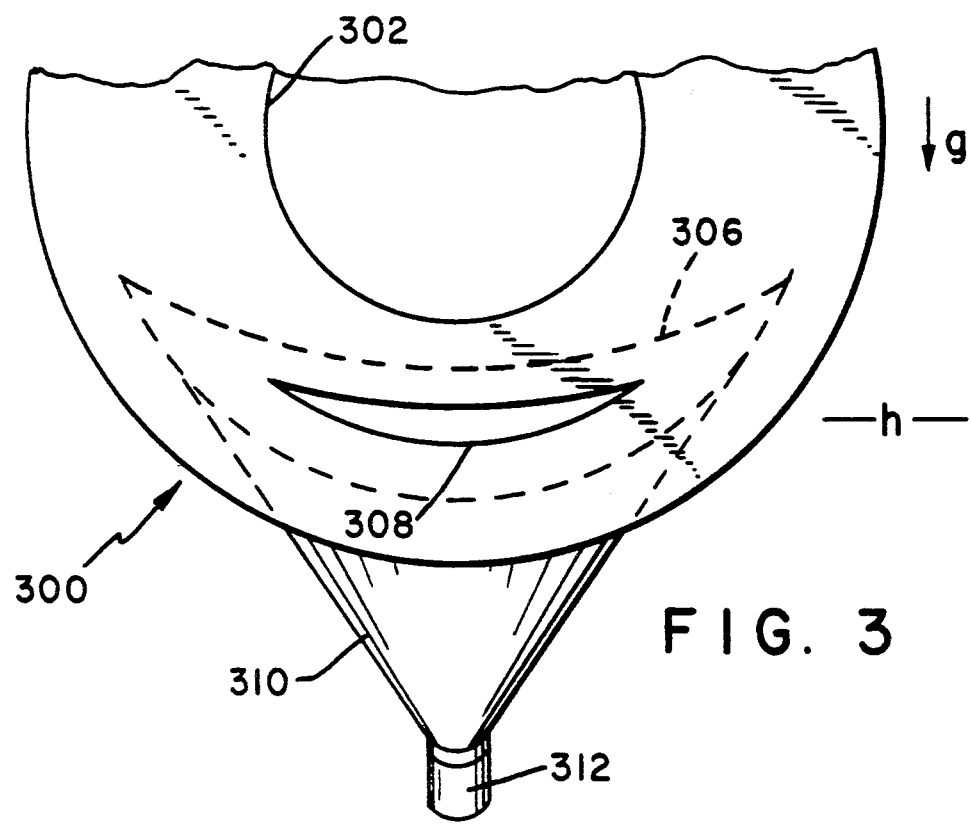
FIG. 3 is a detail of a portion of the modified air ring depicted on FIG. 2.

Now with reference to FIG. 3 there is shown in detail of a portion of the modified air ring depicted on FIG. 2. The portion of the air ring 300 includes a section of the circular die 302 through which the film bubble is extruded in a direction parallel to the horizontal indicator, -h-. Now with greater clarity, the depressed portion which defines the weir 306 of the air ring 300 is seen to be arcuate in shape and positioned relative to the circular die 302 so that the direction of flow of any liquids condensing on the surface of the air ring 300 and in a downward direction due to gravitational effects as indicated by the arrow labeled "g" is condensed and collected in the weir 306 and pass through the annular opening 308 at the bottom of weir 306 and are collected by a manifold 310 (shown partially in phantom) which is connected to a tube 312 through which a vacuum is applied. The effect of the vacuum acts to quickly withdraw any condensed liquid collecting in the weir 306 and minimize the likelihood that the condensed liquid will be entrained by a gas stream.

Figure 4:
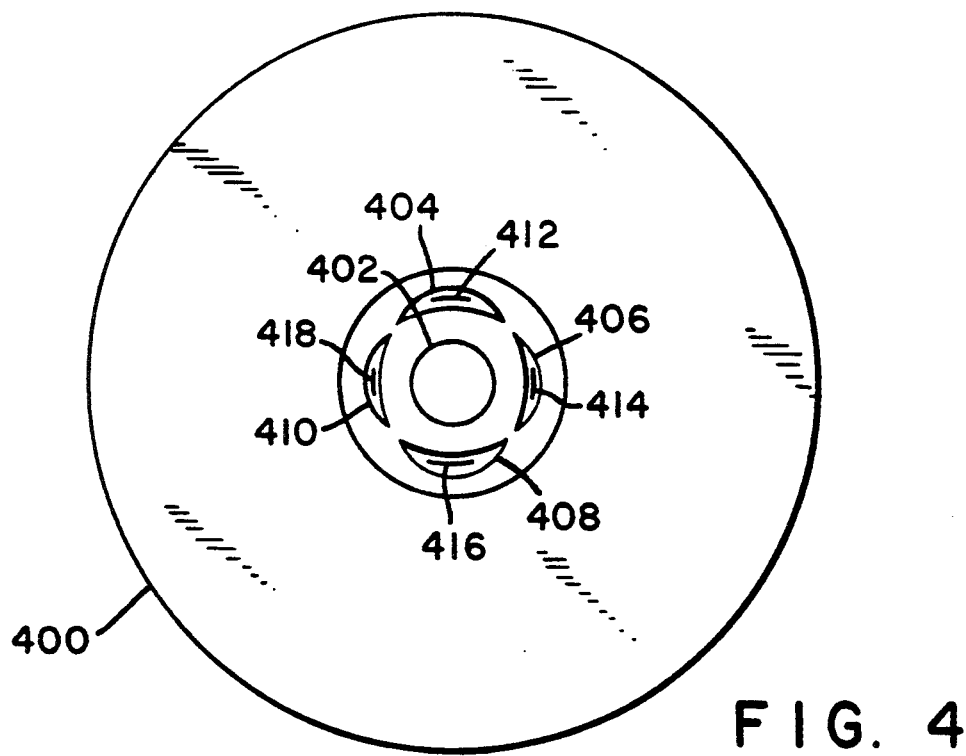
FIG. 4 is a drawing of an alternative embodiment of an air ring modified in accordance to the present invention's teaching.

With regard now to FIG. 4, thereupon is shown an alternative embodiment of an air ring 400 modified in accordance with the present invention's teaching. The modified air ring 400 is an example of a type which finds particular utility for use in a blown film apparatus wherein the central axis of the bubble of blown film would be vertical with respect to the horizontal, and the surface of the modified air ring 400 facing the bubble would parallel to the horizontal. Such an embodiment is shown in FIG. 1; it is thereby to be realized that the modified air ring 400 of FIG. 4 is directed to be used in such a vertical configuration in contrast to the modified air ring of FIGS. 2 and 3, which were directed to be used in a horizontal configuration.

The modified air ring 400 surrounds a circular die 402 and further includes four weirs, 404, 406, 408, 410 arranged peripherally relative to the circular die 402, each of the weirs which includes an annulus 412, 414, 416, and 418 through which any condensing liquid which is collected in the respective weirs may be removed by suitable means, including the use of a vacuum pump connected by one or more tubes.

By means of contrastive reference, a comparison of FIGS. 2 and 4 illustrate two alternative embodiments of modified air rings in accordance with the present invention's teachings. While the features of elements of these modified air rings are dissimilar in some respects, it should be nonetheless appreciated that the configuration of the modified air rings is optimized in accordance with the requirements of each of the methods of production and the respective blown film apparatus within which each will be incorporated. For example, in FIGS. 2 and 3 the air rings are directed for use in an apparatus wherein the central axis of the bubble of blown film being formed will be in the horizontal, and the placement of the face of the air ring 200 facing the bubble will be vertical; hence the use of a single weir in the direction of downward flow of any condensed liquid may be most suited to the entrainment and removal from such a condensed film. In comparative contrast, the air ring of FIG. 4 is directed for use in an apparatus wherein the central axis of the bubble of blown film being formed will be in the vertical and consequently the placement of the face of the air ring facing the bubble will be horizontal; consequently, the condensed liquid is more likely to remain static and is more likely to be entrained by a passing gas stream and come into contact with the blown bubble, an undesirable effect as described above. In order to minimize this undesirable effect, the use of a plurality of weirs 404, 406, 408, 410, and their positioning so to encircle the circular die 402 is directed to enhance the entrainment and removal of any liquid condensing on the surface of the modified air ring 400.

It should be further realized that although the configuration of the weirs illustrated in the various figures were arcuate in shape, it is to be understood that other configurations may be formed, including but not limited to concentric or nonconcentric ridges, circular holes, or other shape which may be found suitable and through which the collected liquid may be withdrawn from the surface of the modified air ring upon which the condensed liquid may collect.

EXAMPLE

In the production of a blown polyvinyl chloride film in process wherein the central axis of the bubble was horizontal, a stainless steel air ring according to FIGS. 2 and 3 was used. The surface of the air ring facing the bubble was perpendicular to the central axis of the bubble being formed. The modified air ring had a total diameter of 18.5 inches, and the annular opening of the weir had an end-to-end length of 1.75 inches. A stainless steel manifold was welded to the underside of the air ring which at one end surrounded the opening of the weir, and at the other end terminated in a ⅛th inch schedule 40 seamless stainless steel nipple. The seams of the welded manifold were air tight to avoid gas leakage. A length of ⅛th inch plastic tubing was attached at one end to the nipple, and at the other end to the inlet end of an "Aqua-Pure" water filter Model AP101T commercially available from Cuno, Inc. A second length of ⅛th inch plastic tubing was attached at one end to the outlet of the Aqua-Pure filter and at its other end attached to a Piab Model M250 air powered vacuum pump, which is commercially available. During production of the PVC film, the vacuum pump was in continuous operation; no appreciable pooling or collection of any condensed liquids were observed to condense on the modified air ring.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A film blowing apparatus for the production of a polymeric film having a circular die and an air ring encircling the circular die the improvement which comprises:
   in that the air ring includes at least one passage therethrough which allows for the passage of condensed plasticizing agents and/or condensed film additives on the surface of the air ring facing a bubble of blown film, and,
   conduit means communicating between the at least one passage therethrough and with a pump, said pump adapted to induce the flow of condensed plasticizing agents and/or film additives from the surface of the air ring facing the bubble of blown film through the conduit means.

2. The film blowing apparatus according to claim 1 where the air ring further includes at least one weir.

3. The film blowing apparatus according to claim 1 where the pump is a vacuum pump.

4. The film blowing apparatus according to claim 1 which further comprises a separator means intermediate the air ring and the pump and in line with the conduit means, the separator means adapted to receive the condensed plasticizing agents and/or film additives and to separate the recovered condensed plasticizing agents and/or film additives from a gas.

5. The film blowing apparatus according to claim 4 wherein the separator means is selected from among: filter, filter unit, vessel or bottle.

6. The film blowing apparatus according to claim 1 wherein the air ring includes a plurality of passages therethrough which allow for the passage of liquid on the surface of the air ring facing a bubble of blown film.

7. A process for removing condensing plasticizing agents and/or condensing film additives from the surface of an air ring which surrounds a circular film forming die used in the production of blown films which comprises the steps of:

removing the condensing plasticizing agents and/or condensing film additives by providing at least one passage through the air ring from the surface of the air ring facing the blown film die upon which the condensing plasticizing agents and/or film additives condense, to a conduit means which is further connected to a pump means, which said pump means is adapted to induce the condensed plasticizing agents and/or condensing film additives to flow from the surface of the air ring and through said conduit means, and, removing the condensed plasticizing agents and/or condensing film additives from the surface of the air ring by operating said pump means to induce the flow of the condensed plasticizing agents and/or condensing film additives to flow from the surface of the air ring and through said conduit means.

8. The process of claim 7 wherein the pump means is operated continuously.

9. The process of claim 7 wherein the pump means is operated periodically.

* * * * *